United States Patent [19]

Edwards

[11] Patent Number: 4,626,763

[45] Date of Patent: Dec. 2, 1986

[54] INVERTER SYSTEM WITH HYSTERESIS TRANSITION BETWEEN PULSE WIDTH MODULATION MODE AND PURE SQUARE WAVE MODE OF OPERATION

[75] Inventor: Charles W. Edwards, Monroeville Boro, Pa.

[73] Assignee: Westinghouse Electric Corp., Pittsburgh, Pa.

[21] Appl. No.: 690,918

[22] Filed: Jan. 14, 1985

[51] Int. Cl.[4] .............................................. H02P 5/40
[52] U.S. Cl. ...................................... 318/811; 363/41
[58] Field of Search ...................... 318/811; 363/41, 42

[56] References Cited

U.S. PATENT DOCUMENTS

| | | | |
|---|---|---|---|
| 3,662,247 | 5/1972 | Schieman | 318/808 |
| 3,919,610 | 11/1975 | Gillett | 318/811 |
| 4,047,083 | 9/1977 | Plunkett | 363/41 |
| 4,377,779 | 3/1983 | Plunkett | 318/811 |
| 4,409,535 | 10/1983 | Hickman | 318/811 |
| 4,419,615 | 12/1983 | Muto et al. | 318/811 |

OTHER PUBLICATIONS

Grant, D. A., "Technique for Pulse Dropping in Pulse-Width Modulated Inverters", IEE Proc., vol. 128, PtB, No. 1, Jan. 1981, pp. 67-72.

*Primary Examiner*—David Smith, Jr.
*Attorney, Agent, or Firm*—M. J. Moran

[57] ABSTRACT

Motor control apparatus for controlling the speed of a motor as a function of a variable frequency square wave and chopping pulses. The chopping pulses are cut off at some value greater than zero pulse width which causes motor voltage to increase in a step manner thus causing a feed forward voltage signal which is related to a DC rectified voltage which cooperates with the square wave production system to increase accordingly. A hysteresis circuit is provided within the pulse generating means to guarantee that once the pulse generation has stopped it will not increase again as a result of the aforementioned motor voltage rise.

4 Claims, 11 Drawing Figures

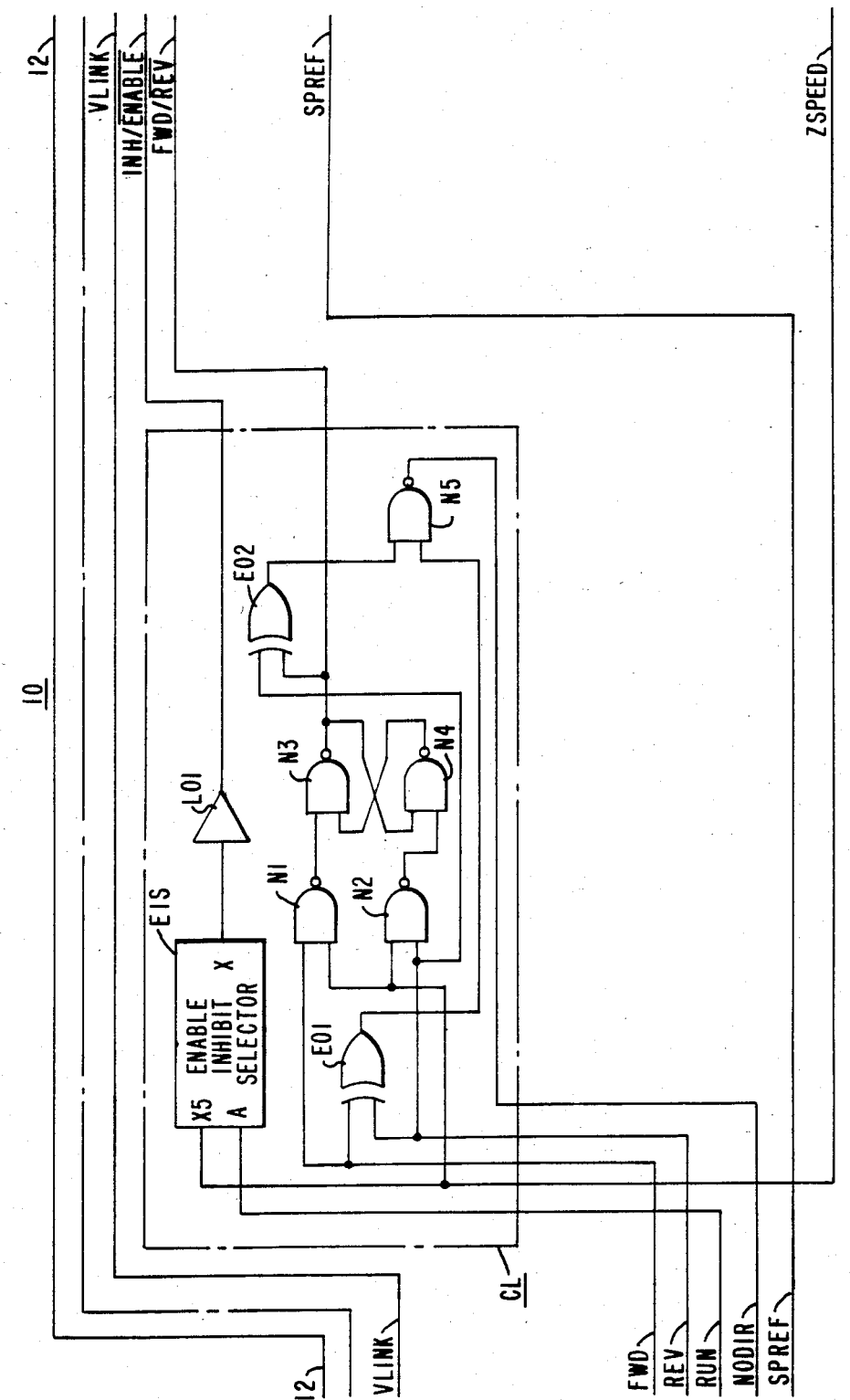
FIG. IC

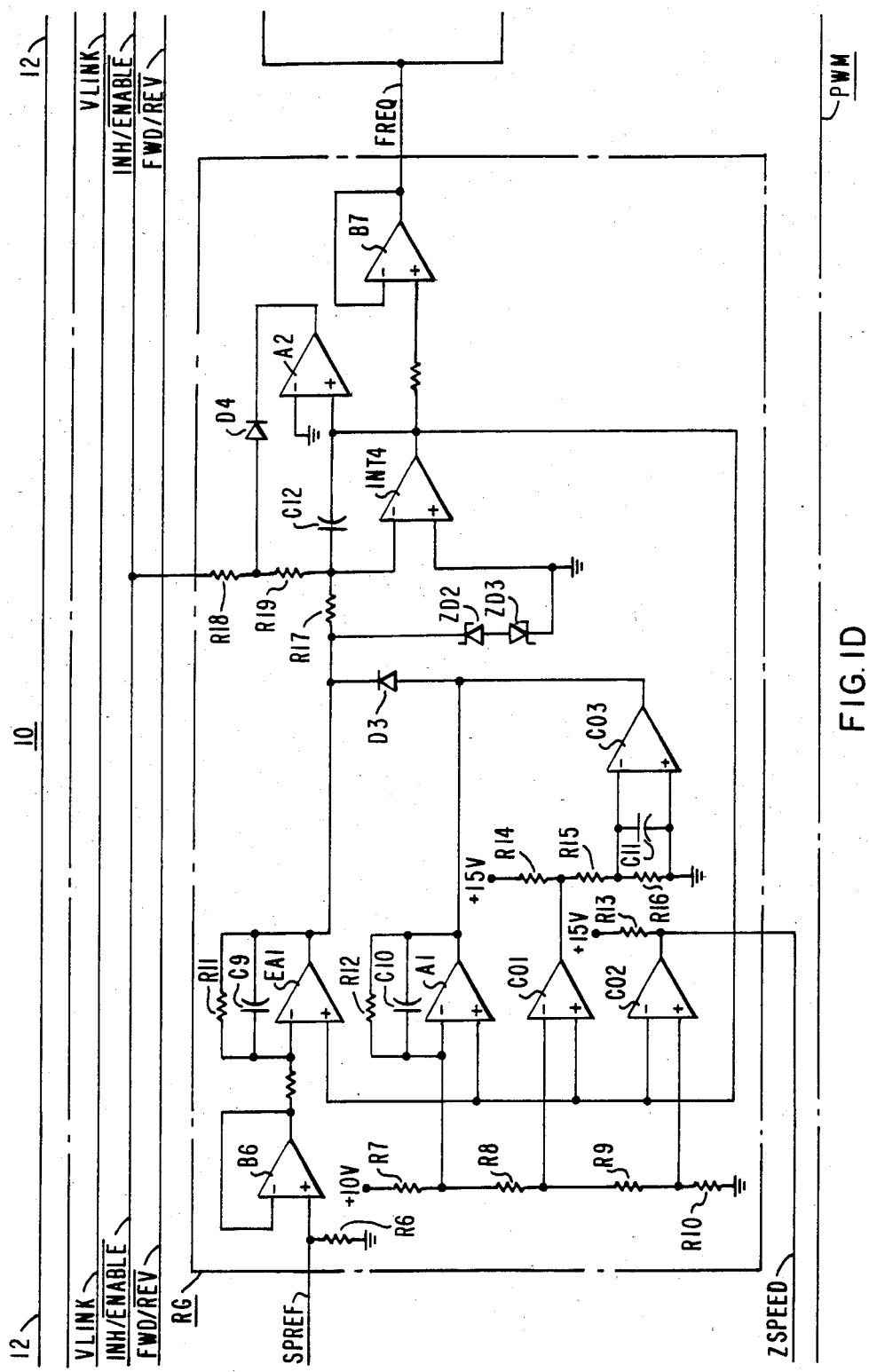
FIG. ID

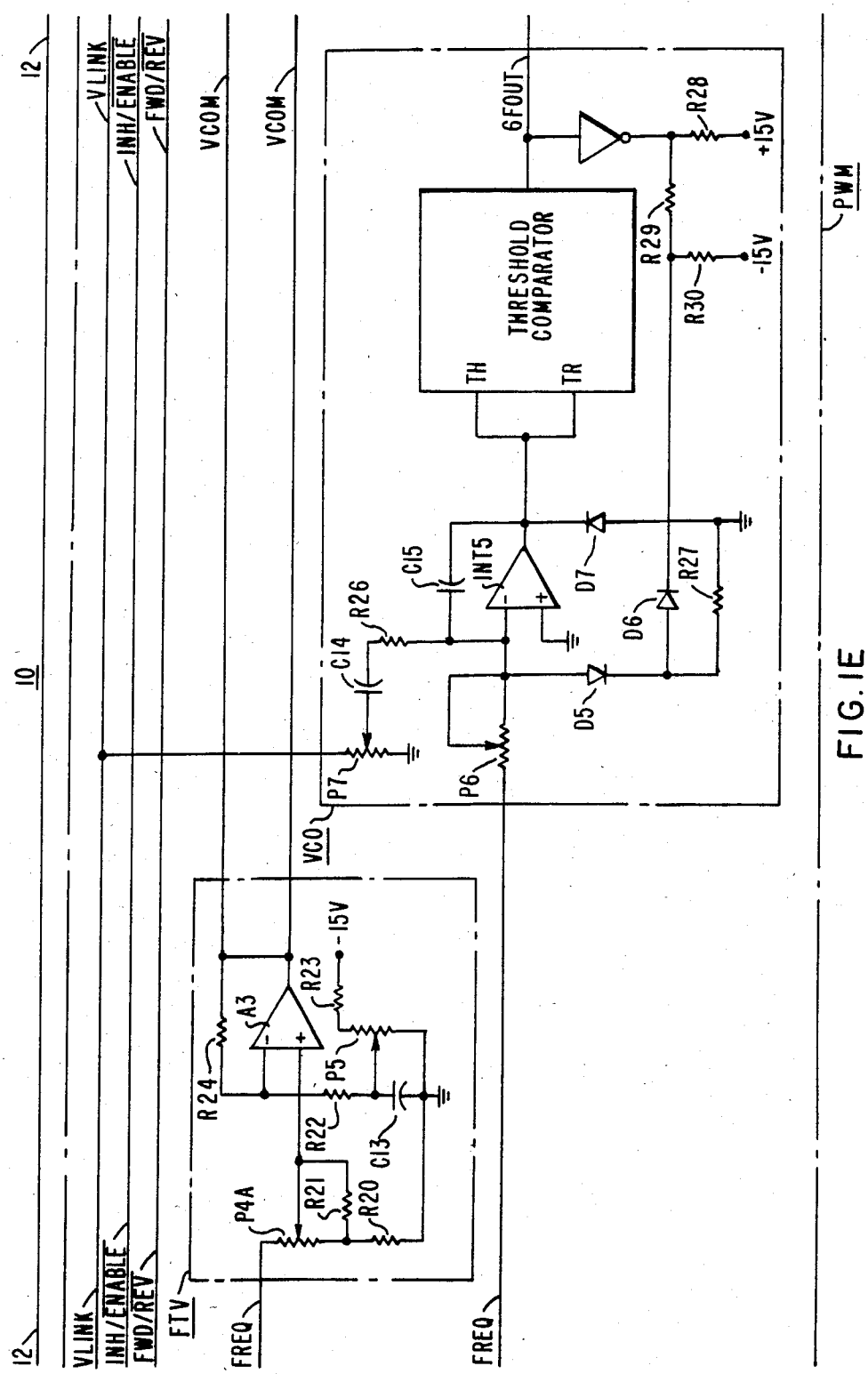
FIG. IE

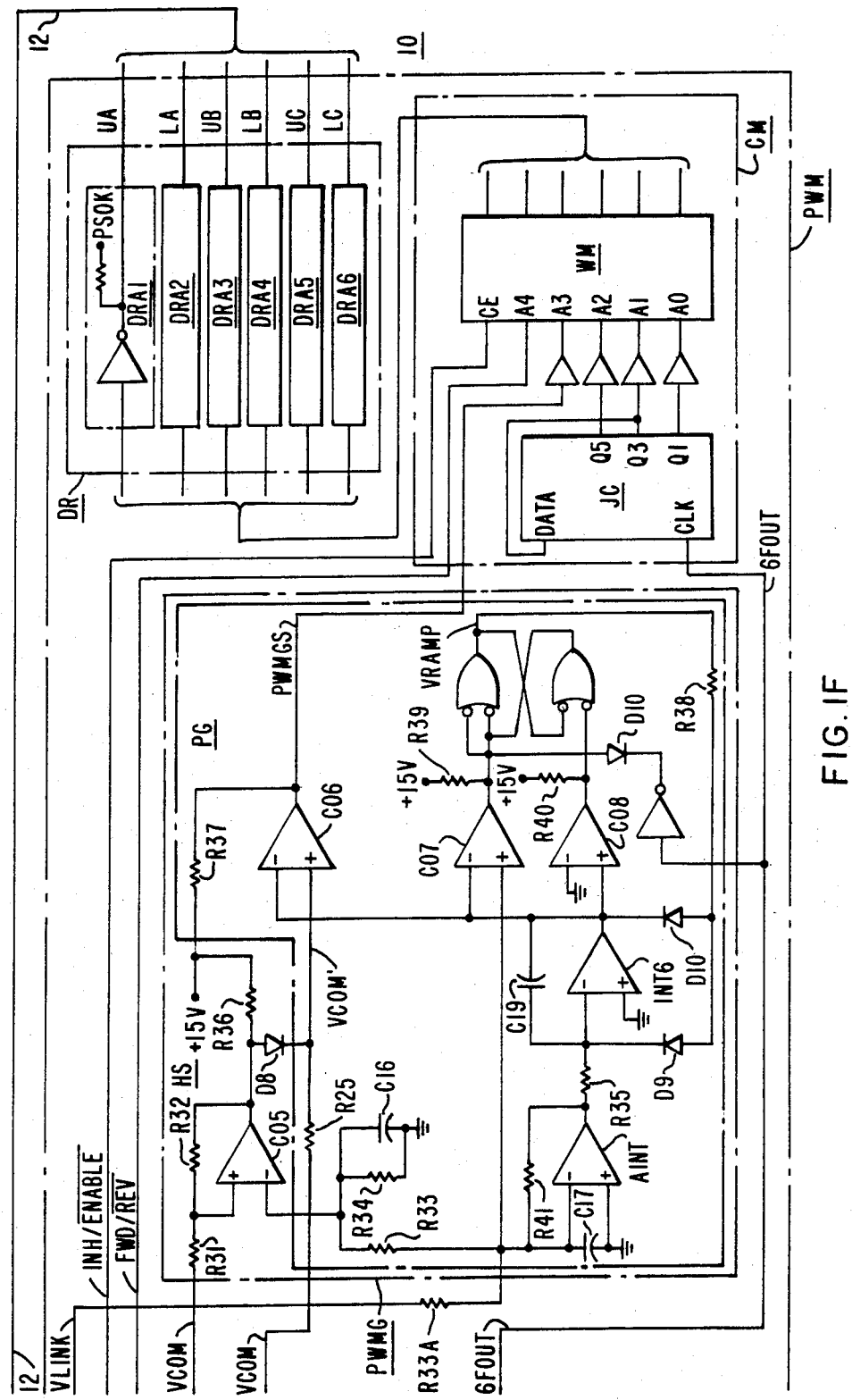
FIG. IF

INVERTER SYSTEM WITH HYSTERESIS TRANSITION BETWEEN PULSE WIDTH MODULATION MODE AND PURE SQUARE WAVE MODE OF OPERATION

BACKGROUND OF THE INVENTION

The subject matter of this invention relates generally to inverter type power conversion systems and more particularly to inverter systems which are operable in two distinct modes, namely a time ratio controlled mode (pulse-width modulation) and a square wave mode. The present invention is especially applicable to those situations where the DC power to the inverter is monitored but not directly controlled by the inverter control system.

Generally, alternating electrical current loads are best suited for alternating electrical current power sources and direct current electrical loads are best suited for direct current electrical power sources. For instance, alternating current induction motors in the past have been driven by alternating current sources of electrical power and direct current motors have been driven by direct current sources of electrical power. Alternating current electrical motors are usually relatively more efficient than direct current electrical motors in converting a given amount of electrical power into rotational energy, whereas direct current electrical motors are easily adaptable for speed control while alternating current electrical motors such as induction motors are not. In any motor application where speed control is not important the alternating electrical current motor is usually chosen. This is because of the previously mentioned efficiency and the additional fact that alternating electrical current is the type that is most readily available because of its superior transmission and distribution characteristics. On the other hand, if speed control is important, the available alternating current's input power is converted by way of a diode bridge-filter-voltage regulator apparatus to direct current which is then utilized to empower the easily speed-controlled DC motor. Until the early 1970's the designer's choice of motor system was usually based on the foregoing criteria. However, with the advent of the so-called energy crisis the efficiency of the AC motor relative to that of the DC motor became exceedingly more important. Consequently, in situations where speed-controlled relatively inefficient DC motors would have normally been chosen, designers and users began to attempt to find ways to adapt speed control techniques to the efficient alternating current motors, especially the simple induction motor. Inverter technology which generally converts DC electrical power into AC electrical power, the opposite of rectifier technology became the cornerstone of the aforementioned attempt. The use of a control system to generate variable frequency AC square waves, when combined with inverter technology, provided a logical means for implementing the solution. Furthermore, the use of pulse-width-modulation techniques in conjunction with the square wave generation extended the frequency range over which speed control of an AC motor could be implemented. It is a known characteristic of AC motors that the machine performs at a high level of efficiency if the phase voltage across the windings thereof varies proportionally to the frequency, that is the higher the frequency the higher the phase voltage. In the past, operating in the pure square wave mode of operation as the controller increased the square wave frequency a signal was provided to a device controlling the DC input power to cause the voltage thereof to increase proportionally. On the other hand, in the pulse-width-modulated mode of operation, as the overlying frequency was varied, pulses were generated to be mixed with the square wave signal in order to create notches therein which had the effect of reducing the overall voltage for relatively lower frequencies and proportionally increasing the overall voltage for relatively higher frequencies, all within the pulse-width-modulated mode of operation. As the frequency required grew larger in the pulse-width-modulated mode of operation, the notches and correspondingly the pulses which produced those notches, became correspondingly smaller so that the overall voltage increased proportionally. Eventually, near the transition frequency between the pulse-width-modulation mode of operation and the pure square wave mode of operation, the notch creating pulses became so narrow in time that the power switching devices in the inverter could not properly duplicate them. This is due to such phenomena, for example, as snubber interreaction and commutation recovery. A simple solution in the past was to simply stop generating pulses in the pulse-width modulation mode of operation when the pulses became too narrow to be appropriately handled by the inverter power circuitry and merely to jump to the higher frequency pure square wave mode of operation with an attendant step function discontinuity in motor voltage. The discontinuity had the effect of increasing the average voltage applied to the load in a step function. This sudden increase in voltage had a tendency to cause problems in the AC motor, which problems may be associated with oscillation among other undesirable characteristics. One prior art solution was to correspondingly modify the already controlled DC input voltage to the inverter so that the effect of the discontinuity could be cancelled out. Reference is made to U.S. Pat. No. 3,870,945, issued Mar. 11, 1975 to N. P. Pedersen et al in which the foregoing is set forth.

As the state of the art in inverter technology has increased over the years, the demand for simplicity and a further reduction in the expense of operation has increased correspondingly. For example, it would be very desirous for relatively uncomplicated situations not to have to increase the voltage proportionally with an increase in frequency in the pure square wave mode of operation. Said in another way it would be very desirable to operate the motor in the square wave mode of operation at a constant voltage. If this is allowed to happen, then no control is necessary for the DC input voltage, it being remembered that voltage control in the pulse-width-modulation mode of operation is provided by the "chopping" technique described previously where pulses are utilized to create notches in the basic square wave. The elimination of voltage control devices and equipment for the input to the inverters is very desirable as that obviously leads to a less expensive inverter system. It does mean, however, that except for variations in input voltage due to line phenomena, etc., for example, that the inverter system is operated at a constant DC input voltage over its entire frequency range of operation. It is, however, desirable to monitor the input DC voltage as a variation of the DC voltage due to line transients and other phenomena causing a slight short term raising or lowering of the DC voltage which can have a negative effect on the motor controlled by the inverter. To do this it would be desirable to monitor the DC voltage and provide a feed forward signal to the control circuit for the inverters so that slight changes in DC voltages can be accommodated for in a feed forward fashion, for example. This very desirable feature has a drawback associated with the previously described transition region between the pulse-width-modulation mode of operation and the constant voltage variable frequency mode of operation. The undesirable feature is associated with the fact that eliminating pulses as is done in the prior art and as is necessary in the present state of the art and then quickly moving into the constant voltage pure square wave mode of operation results in the previously described sudden increase in motor voltage when the notches are first ignored. When the motor voltage is increased the motor current decreases. However, the DC source is never a perfect voltage source and consequently decreases in the motor current will cause a correlated rise in the input voltage to the inverter. This rise in voltage is monitored by the control system. The response to the slight rise in DC input voltages is for the control system to request a slightly wider chopping notch. If the inverter system is operating near the transition frequency, the notch will become wide enough for the inverter switches to recognize and handle it. This will result in a sudden decrease in motor voltage and a corresponding increase in motor current causing the DC input voltage to droop. The control responds to this to narrow the notches, starting the cycle over again. Thus it can be seen that with a feed forward voltage sensor for the DC input voltage to the inverter where pulses below a certain minimum time value are ignored very undesirable oscillation can occur near the transition region between the pulse-width-modulation mode of operation and the pure square wave mode of operation. It would be desirable therefore if apparatus could be provided which would alleviate the foregoing problem.

SUMMARY OF THE INVENTION

In accordance with the invention, apparatus for controlling the speed of a motor is taught. There is provided a source of direct electrical current having a nominal DC source voltage which may vary within limits. An inverter is provided which is interconnected with the source of DC voltage and the motor for providing controlled power to the motor in the form of controlled variable frequency square waves. Additionally, the square waves are "chopped" in accordance with controlled width-modulated chopping pulses in a predetermined square wave frequency range for providing speed control and complementary motor winding voltage control in the frequency range. The inverter is presumed to be unreliable for producing width-modulated chopping pulses which are narrower than a predetermined pulse width. There is also provided a control circuit which is interconnected with the DC source and with the inverter for providing controlled signals to the inverter which are indicative of the frequency of the square waves and for providing the chopping pulses to the inverter in accordance with a speed signal and a DC source voltage signal. The control circuit additionally includes a pulse generator which receives the speed signal and the DC source voltage signal and uses amplitude related values thereof for producing the chopping pulses, the width of which is proportional to the difference between the source voltage signal and the speed signal for only those amplitude values of the speed signal which are less than the amplitude values of the DC voltage source signal. For values of the speed signal greater than the DC voltage source signal no pulses are produced. There is also provided a hysteresis switching circuit which also receives the speed signal and the DC source voltage signal. This circuit selectively provides to the pulse generator an additional input bias signal, which signal when applied changes the speed signal to a second speed signal which is equal to the first speed signal plus a bias signal. The bias signal is applied when the speed signal is increasing and when the speed signal is equal to some constant times the DC source voltage signal, where the constant is indicative of the predetermined minimum pulse width. The value of the bias signal is $\geq 1$ minus the constant times the DC voltage signal plus some value which is equal to the amount that the DC voltage signal will increase as the result of the motor winding voltage increasing due to the sudden cessation of chopping pulse production. The bias signal is removed by the hysteresis switching circuit when the speed signal is equal to some second constant times the DC voltage signal when the speed signal is decreasing, where the second constant is less than the first constant and where the difference between the first and second constant is such that an increase in the DC voltage signal by an amount X will not cause the second constant times the DC voltage signal plus X to equal the first constant times the DC voltage signal.

BRIEF DESCRIPTION OF THE DRAWINGS

For a better understanding of the invention, reference may be had to the preferred embodiment thereof, shown in the accompanying drawings in which:

FIGS. 1A–1F show a circuit diagram of the invention partially in block diagram form and partially in circuit element form;

DESCRIPTION OF THE PREFERRED EMBODIMENT

Figure 1A:
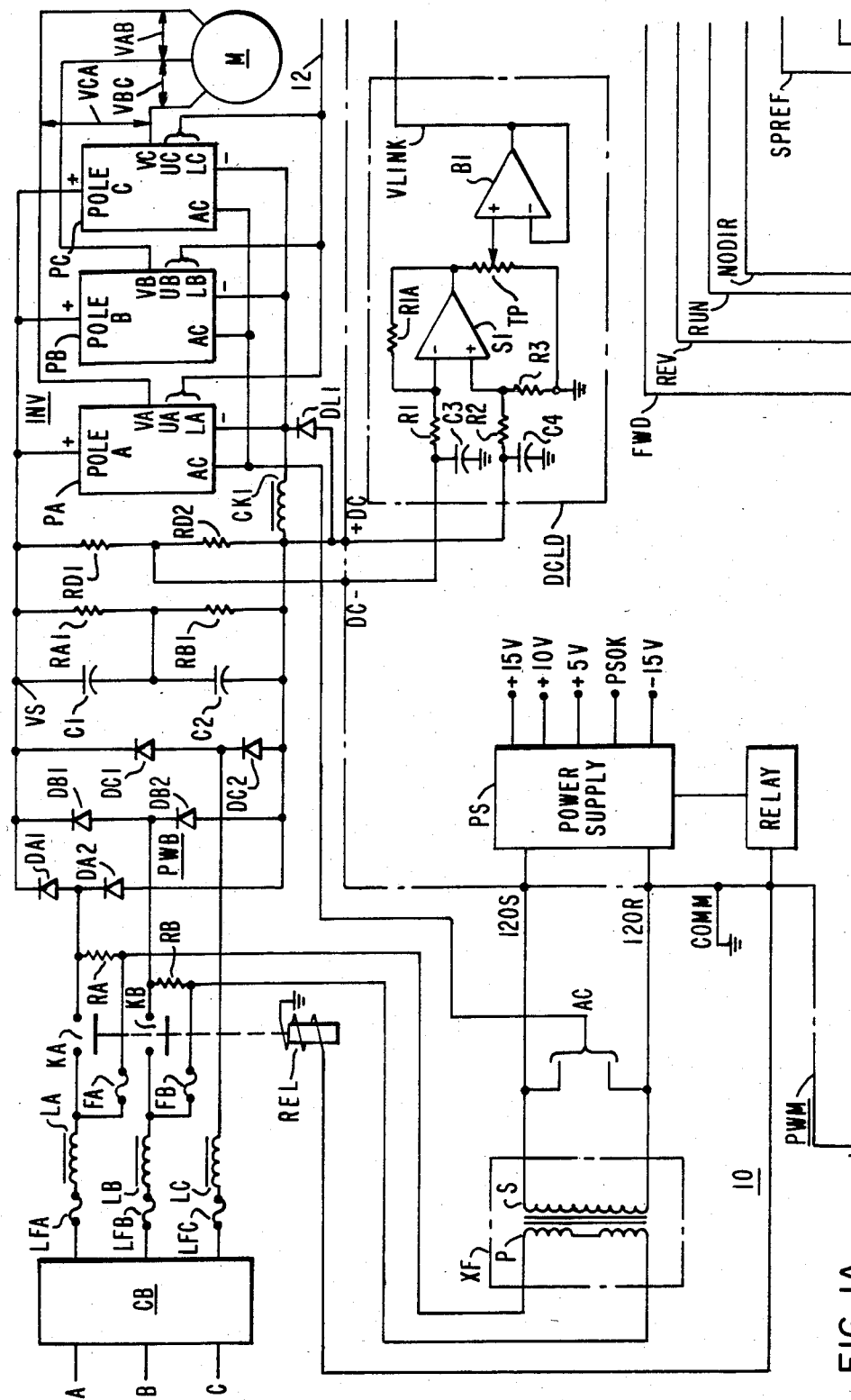
Figure 1B:
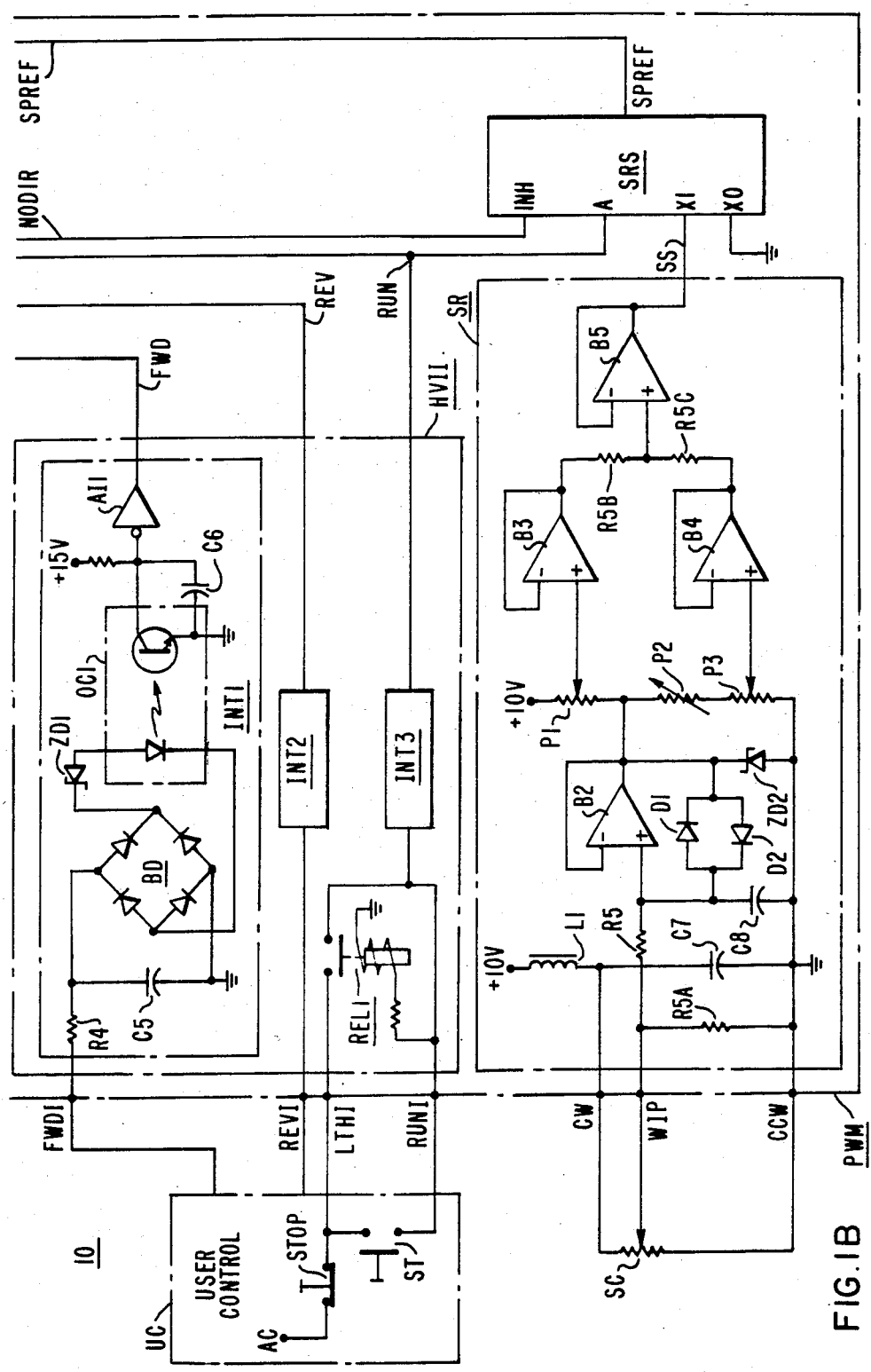

Referring now to FIGS. 1A through 1F a schematic diagram partially in block diagram form of a motor system 10 is shown. There are three AC power lines A, B and C which may in a preferred embodiment of the invention represent a 480 volt AC input line. These lines may be supplied to a circuit breaker CB and thence to three line fuses LFA, LFB and LFC. From there the lines may feed surge inductors LA, LB and LC. The lines may then feed through a contactor with contacts KA, KB to a power bridge PWB. Line A feeds to the diode set DA1, DA2, line B feeds to the diode set DB1, DB2, and line C feeds to the diode set DC1, DC2. In this embodiment the cathodes of the diodes DA1, DB1 and DB2 are interconnected electrically and the anodes of the diodes DA2, DB2 and DC2 are interconnected electrically. A filter represented by parallel resistive element RA1 and capacitive element C1 connected in series with the parallel combination of the resistive element RB1 and the capacitive element C2 is connected across the power bridge PWB. Across this filter is connected the series combination of two resistive elements RD1 and RD2. These are utilized as will be described hereinafter to form an input circuit for a DC link arrangement. A choke arrangement CK1 and DL1 is provided for current limiting in fault situations. Connected to the positive side of the DC bridge PWB are three parallel inverters PA, PB and PC. Each inverter consists of gate turn-off thyristors GTO's, the conduction status of which are controlled by the input signals UA LA, UB LB, and UC LC, repsectively. The negative side of each inverter is connected to the choke CK1. In addition, AC electrical power is provided to each inverter in a manner to be described hereinafter. Each inverter PA, PB and PC is interconnected with a line VA, VB and VC of a three-phase induction motor M so that the line or phase voltages VAB, VBC and VCA may be produced on the stator windings of the induction motor M in accordance with frequency and voltage amplitude information provided by way of input terminals UA LA, UB LB, and UC LC, respectively, the source of which will be described hereinafter. Even though an induction motor such as M is expected to rotate at some synchronous frequency minus some small value of slip, the utilization of system 10 allows the induction motor to be operated through a variable range of frequencies which can be significantly less than the synchronous speed.

The normally opened contacts KA and KB are bypassed by serially connected fuse FA and resistive element RA for contact KA and fuse FB and resistive element RB for contact KB. A system power supply transformer XF is connected between the interconnection of fuse FA and resistive element RA and the interconnection between fuse FB and resistive element RB. The secondary S of transformer XF is utilized to provide energy for a power supply PS in a portion of the control circuit PWM for the system 10. The secondary winding S of the transformer XF also provides power to the AC inputs of the GTO inverters PA, PB and PC. The relay coil REL for the normally opened contacts KA and KB is controlled by a detector circuit and closes the normally open contacts KA and KB, thus latching power to the remainder of the system 10. Should voltage derived from the secondary winding S disappear for any reason, the contacts KA, KB will return to their normally open state, thus deenergizing the system 10. This provides a failsafe mode of operation. Signals which control firing sequence and duration as well as frequency, for example, are supplied to the terminals UA, LA, UB, etc. of inverters PA, PB and PC, respectively, by way of cable 12. These signals originate in a pulse-width-modulation circuit PWM.

Portions of circuit PWM which are related to the present invention are described hereinafter. DC link information as described previously is provided to the circuit or card PWM by way of terminals DC+ and DC− on the card PWM. This information is related to the regulation, stability and variation of the DC output value of the bridge PWB. This information is provided to a device known as a DC link detector DCLD, the output of which is designated VLINK and which is represented by a low level DC voltage which varies in proportion to variations of the DC output of the bridge PWB. In the preferred embodiment of the invention VLINK is nominally 5 volts when the output VS of the bridge is 650 volts DC.

There is provided a high voltage input interface circuit HVII which in the preferred embodiment of the invention may accommodate six 120 volt AC command inputs which are normally provided by the user of the system 10. For purposes of simplicity of operation only those signals which may conveniently interact to utilize the present invention are described herein. Input signals FWDI, REVI, RUNI and LTHI are provided by the user to the high voltage input interface HVII. The presence or absence of 120 volt AC command input signals is represented by a digital 1 or 0 respectively at the output of the functional block HVII. The output signals are respectively represented as FWD, REV, RUN. No output signal is utilized to represent the function LTHI as that function represents a latching function for the signal RUN. The functional block HVII filters the high voltage input signals, causes full wave rectification thereof and opto-isolation. The resulting output signal is an exemplary +15 volt logic signal which is high when the corresponding input is energized. The signal FWDI commands forward direction for the motor M. The signal REVI commands reverse direction for the motor M. The signal RUNI commands running of the motor M with a speed which is set by a speed circuit SR as will be described hereinafter. In a preferred embodiment of the invention a typical stop-start pushbutton for motor control is interconnected with the LTHI and RUNI inputs of the high voltage input interface HVII and with a 120 volt AC source. The normally closed stop pushbutton STOP is connected on one side to the 120 volt source and on the other side directly to the LTHI input terminal and through a normally open start pushbutton ST to the RUNI input terminal.

There is provided a speed reference circuit or functional block designated SR having three input terminals designated CW, WIP and CCW. To these three input terminals is connected a three terminal potentiometer designated SC which may be remotely mounted or may be mounted on the front panel of the cabinet which contains the PWM card. One side of the potentiometer SC is connected to the CW terminal. The other side of the potentiometer SC is connected to the CCW terminal, and the wiper of the potentiometer SC is connected to the WIP terminal. The speed pot is used in conjunction with the run condition as designated by empowering the RUNI input terminal of the high voltage input interface HVII to control the speed at which the motor M rotates in either the forward or reverse direction, depending upon the status of the FWDI or the REVI inputs. Preferably the speed pot is a 10 kilohm potentiometer. Adjustable functions within the speed reference SR allow the minimum speed to be set anywhere in a range from 0 Hz to 40 Hz and the maximum speed to be set anywhere in a range from 40 Hz to 120 Hz. The selected and calibrated speed is represented by a DC level in the range of 0 to 10 volts DC, which is provided on an output line SS.

There is also provided for the card PWM a control power supply PS which receives input at the terminals 120S and 120R which are interconnected with the secondary S of the transformer XF. Only those voltages necessary to empower portions of the card PWM for utilizing the present invention are shown and described. These are regulated ±15 volt DC and 5 volt DC values, an output signal PSOK, which means that the power supply is functioning properly when high, and a +10 volt signal. These voltage values are conveniently routed to other portions of the card or circuit PWM.

There is provided a control logic functional block or circuit CL. This block takes as inputs logic level versions (FWD, REV, etc.) of high voltage input signals and several internal signals which will be described hereinafter and manipulates and combines those signals in various ways with standard combinatorial logic to perform the overall supervision of the inverter system 10. Those signals which are utilized to demonstrate and teach the present invention are shown and described with respect to the control logic CL. Signals FWD, REV and RUN are provided as inputs as well as a signal designated ZSPEED, the generation of which will be described hereinafter. Functionally, the FWD and REV signals are inputted to a gated RS flip-flop which will be described hereinafter to determine the actual direction of the controller output. The commanded direction signal is then latched when the ZSPEED signal is high, which is indicative of the motor rotating at a pseed of less than 2 Hz in either the forward or reverse direction. If neither of the signals FWD or REV is present or the commanded direction does not equal the actual direction, a signal NODIR will become asserted, which as will be described hereinafter, causes a speed reference signal SPREF to be set to zero. This has the effect of slowing the motor down. The command of a reversal of direction will assert the NODIR signal. This will cause the controller to decelerate to less than 2 Hz, thus causing the ZSPEED signal to momentarily go high, thus causing a direction change due to the triggering of the previously described RS flip-flop. At this point the NODIR signal will go false, or to a non-asserted state, which is represented by a digital 0, allowing the drive to accelerate, as will be described hereinafter, in the other direction, until the speed of the motor equals the speed reference set by the pot SC. Other outputs from the control logic circuit are INH/ENABLE and FWD/REV. These signals are represented by digital 1's in the true state and digital 0's in the false state.

There is also provided a speed reference selector SRS, which in a preferred embodiment of the invention is an 8 to 1 analog multiplexer. The multiplexer addresses bits derived from the high voltage input interface signals such as the RUN signal in the preferred embodiment of the invention and chooses the appropriate speed signal, which in this case can only be found on the line SS as provided by the speed reference functional block SR, although in other cases other sources of speed may be selected. Those sources were deleted from this description in order to simplify illustration of the present invention which is not dependent upon which source is chosen. At the inhibit input terminal INH, the NODIR section signal from the control logic CL is provided. The input line SS is connected to the input terminal X1 on the speed reference selector SRS. The X0 input terminal thereof is connected to ground or system common. As long as the signal on the inhibit terminal INH is 1, then the SPREF output of the multiplexer will be in the high impedance state. The resistor R6 will cause the voltage level at SPREF to be zero. If the A input terminal is nonasserted, digital 0, then the grounded X0 terminal will be routed to the SPREF output. This means that an indication is provided that the motor speed should be made zero.

The output signal SPREF from the speed reference sensor SRS is provided to a ramp generator RG. The INH/ENABLE signal is also provided as an input to the ramp generator RG. If there is no need to inhibit then a "false" condition on the INH/ENABLE exists which is digital 0. However the ramp generator RG would be inhibited if the INH/ENABLE signal were to go to the "true" condition or digital 1. Presuming there is no need to inhibit when the SPREF output signal is provided to the ramp generator RG, the ramp generator tracks the selected speed reference output SPREF and reacts to the voltage level thereof. The ramp generator RG has the capability of limiting the rate of change of the frequency. The ramp generator provides the ZSPEED feedback output signal as described previously which will equal a digital 1 if the speed of the motor is less than 2 Hz. Otherwise the ZSPEED output signal will be a digital 0. Also provided as a feed forward output for the ramp generator RG is a signal designated FREQ. The FREQ signal is a voltage level which is related to frequency. This signal is also provided concurrently to a voltage-controlled oscillator VCO and to a frequency-to-voltage functional block generator FTV. Once the frequency reference FREQ has been developed, it is necessary to generate a voltage reference from this result. The frequency reference FREQ is scaled by a user adjustable volts-per-hertz parameter which determines the volts per hertz slope, which in a preferred embodiment of the invention is in a range 3.83 to 11.5 volts-per-hertz range. The output signal from the frequency-to-voltage generator is designated VCOM.

The voltage-controlled oscillator VCO consists of an integrator INT5 and a threshold comparator which generate a pulse train which contains information which is proportional to the requested frequency. The integrator INT5 generates a negative going sawtooth waveform with a slope proportional to the requested frequency. The negative sawtooth moves between a lower threshold which in a preferred embodiment of the invention is +5 volts and an upper threshold which in a preferred embodiment of the invention is +10 volts. The reset interval is very short and therefore a negligible part of the pulse, i.e., when the lower threshold +5 is reached, the integrator is rapidly reset to the upper threshold +10 volts. The voltage-controlled oscillator VCO generates a pulse train which has a frequency which is six times the frequency commanded. This pulse train is identified as 6FOUT. The voltage-controlled oscillator VCO has a stability feedback capability. The VLINK output signal described previously is utilized to add a user adjustable amount of transient variation in the DC link voltage to the VCO frequency requested to damp motor instabilities.

There is also provided a device known as a pulse-width-modulator generator PWMG. This device in its simplest form produces a pulse train of a generally fixed carrier frequency which in the preferred embodiment of the invention is approximately 1 kHz, but the duty cycle of which is related to the output voltage VCOM of the frequency-to-voltage functional block FTV. The DC link voltage VLINK is provided to the pulse-width-modulator generator PWMG to give a feed forward correction of the previously described duty cycle or pulse width of the carrier frequency to adjust for variations in the DC link while allowing the carrier frequency to remain constant. If the DC link voltage should increase, the pulses would widen slightly to maintain the motor voltage at an approximately constant value, and of course the opposite will occur if the DC link voltage decreases. The output of the voltage-controlled oscillator VCO is also interconnected with the pulse-width-modulator generator PWMG to synchronize with the output signal 6FOUT of the VCO. This has the tendency to prevent the generation of low frequency beats which can cause corresponding motor currents of objectional proportions.

There is also provided a counter-mixer CM. The counter-mixer CM takes the output signal 6FOUT from the VCO and the output signal PWMGS from the pulse-width-modulation generator PWMG and utilizes these signals to provide switching information for the GTO's of the inverters to allow those GTO's to switch the DC voltage impressed thereacross to the various motor field windings to cause the motor to rotate at the frequency requested. Part of the counter-mixer CM is a device called a Johnson Counter JC which utilizes the signal 6FOUT on its clock to generate three sets of phase shifted output signals, one for each of the phases A, B and C of the gate controlled devices PA, PB and PC. These essentially consist of three square waves, each phase shifted by 120 degrees and having a frequency which is one-sixth (that is proportional to) of the required frequency FREQ. The higher the frequency FREQ the more pulses per unit time for the signal 6FOUT and therefore the higher the frequency of the three square waves.

The output of the Johnson Counter JC is provided to a waveform mixer WM which converts the six-step waveform from the six-step counter JC and the PWM duty cycle pulses to the three-phase waveform which is used by the gate drive to control the inverter switches. These signals are fed on a line-to-line basis to output buffers DR which are optocoupled line drivers for the gate turn-off devices GTO of the inverters PA, PB and PC. As was mentioned previously, the gate turn-off devices in the inverter cannot be switched either on or off for infinitesimally short periods because the voltage slew snubbers therein (not shown) must be discharged before reuse, and the di/dt limiting inductors must dissipate their stored energy before the next switching event. To solve this, minimum on and off times are imposed by the gate drive circuitry. If a pulse narrower than the minimum allowed is requested, it is ignored by the gate drive. This, however, causes problems in two areas of operation—at very low frequencies and at the transition between control of voltage by the PWM pulses and the constant voltage six-step mode, or said in another way, where the motor control switches from constant torque to constant voltage. At low frequencies with little or no boost the narrow pulses cannot be reproduced and no voltage is developed. As the frequency is gradually increased the pulses become wide enough to be reproduced and voltage is suddenly developed. Unfortunately the time delays of each of the gate drive circuits are not exactly identical, causing some to turn on before others as the frequency is increased. This can result in noticeable DC currents in the motor until all the gate drives have turned on. This is not generally a problem at low boost levels although the audible characteristics are unusual. The problem occurs at intermediate boost levels where boost is controlled in the frequency-to-voltage device FTV. The boost relates to the amount of extra voltage which must be added to the VCOM output signal to overcome the effects of the current times resistance drop in the motor. The problem can be described in terms of the per unit voltage change experienced from the no-pulses state to the state represented by the narrowest pulses that can be reproduced. The voltage change is simply pulse width times the carrier frequency. This problem can be attacked in two ways—first by reducing the minimum pulse that can be reproduced and second, by varying carrier frequency, perhaps using 1 kHz from 10 kHz on up to maximum voltage, but dropping below 10 kHz to some as yet undetermined value at 0 Hz in a linear manner. The even more troublesome part of the problem is the transition between the PWM mode and the six-step mode. As the frequency increases, the off period of the duty cycle waveform becomes shorter. Near the maximum output voltage the notches become too narrow for the gate drives to reproduce. This results in a sudden increase in the motor voltage. If the load is fixed, the response of the motor is to reduce the current. Since the DC link is not a perfectly "stiff" source of DC, the voltage thereof increases. The control PWM attempts to reduce this voltage increase by increasing the requested notch width. The notches are then again reproduced, lowering the voltage of the motor, increasing its current and consequently lowering the DC link voltage, starting the cycle of oscillation over again. The way to solve this problem is to utilize a hysteresis characteristic. A threshold of approximately 4% is utilized. The technique utilized is such that when the frequency is increasing, the notch is eliminated when it narrows to approximately 40 microseconds. When the frequency is decreasing, the notch width is approximately 60 microseconds when it is first restored. The circuitry HS shown in the upper lefthand corner of the pulse-width-modulation generator PWMG is utilized to accomplish this.

Figure 2:
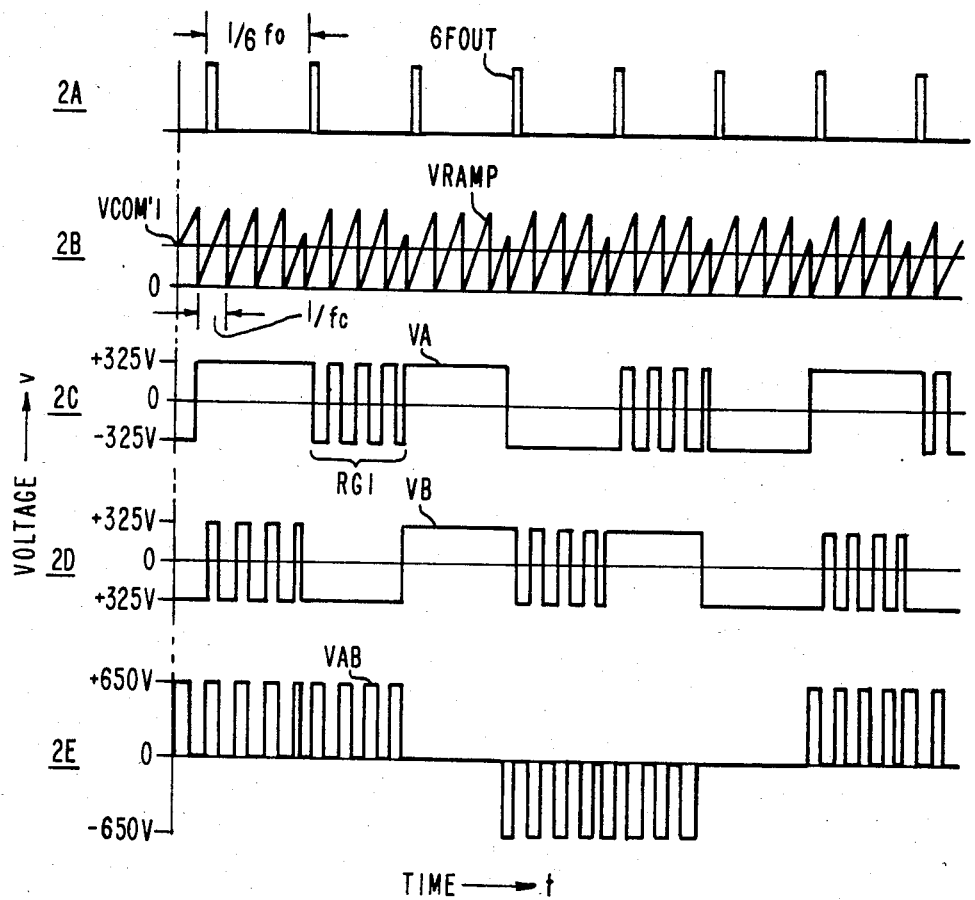
FIG. 2 shows a plot of voltage versus time for various voltage points in the circuit of FIGS. 1A–1F for an output speed or frequency $f_O$ for the motor to be controlled by the circuit of 44.4 Hz.
Figure 3:
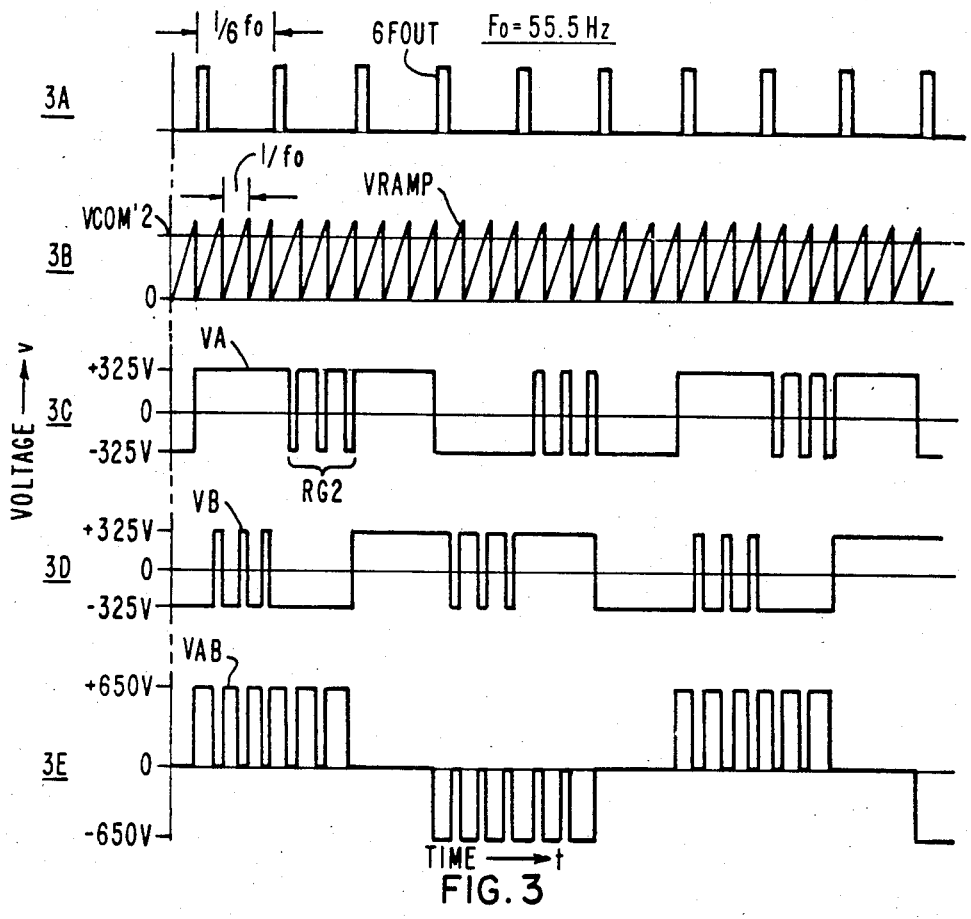
FIG. 3 is similar to FIG. 2 except for $f_O$ equal 55.5 Hz.

Referring now to FIGS. 2 through 5 in addition to FIG. 1, the effect of the precedingly described apparatus upon the motor windings is described and shown. FIGS. 2A and 2B show the signal 6FOUT versus time. 6FOUT equals $6 \times f_o$ which is the frequency or "speed" at which the motor M is to rotate. In FIG. 2, $f_0$ is chosen to be 44.4 Hz for the purpose of illustration. In FIG. 3, a frequency $f_0$ of 55.5 Hz is chosen and in FIG. 4 a frequency of $f_0 = 66.6$ Hz is chosen. Note that the spacing, i.e. time, between pulses decreases from FIG. 2A to FIG. 3A as the frequency increases. FIG. 2B and FIG. 3B show the relationship of the ramp voltage VRAMP to the level VCOM' (VCOM'1 for FIG. 2B and VCOM'2 for FIG. 3B). As the frequency increases, the level of VCOM' becomes higher, thus generating relatively narrower pulses. The pulses can be seen most clearly in portions of FIGS. 2C and 3C, respectively, as being superimposed on the basic frequency square wave (see regions RG1 and RG2 for example). The output voltages VA and VB of FIGS. 2C and 3C and 2D and 3D, respectively, are generated by like-shaped pulse trains emanating from the driver DR and controlling the inverter PA and PB. The actual driving waveform for the motor M in each case is the difference between the voltage VA and VB. This is shown as voltage VAB in FIGS. 2E and 3E. The difference from FIG. 2E to FIG. 3E where the frequency increases is reflected by a decrease in the period of the basis square wave and the narrower superimposed pulses. Attention is called to FIGS. 4A, 4B and 4C. For purposes of simplicity of illustration the output signals 6FOUT and VRAMP have been deleted from FIG. 4. The output voltage waves for the inverters PA and PB are shown as well as the phase voltage VAB. Notice that the frequency $f_0$ is chosen to be 66.6 Hz and also notice that no notches are present on the square waves VA, VB and VAB. Attention is called to FIG. 5 where the phase voltage VAB versus the frequency $f_0$ is plotted. In the constant torque range, that is below $f_0=60$ Hz, pulses are present. Above $f_0=60$ Hz, however, the motor operates in the constant voltage range where no pulses are present. The three illustrative frequencies $f_0=44.4$ Hz, $f_0=55.5$ Hz and $f_0=66.6$ Hz are shown for comparison. As the frequency approaches 60 Hz from below that value, the width of the notch pulses becomes increasingly smaller. In the region of the knee of the curve, the region designated AA, the problem overcome by the present invention becomes very critical. Here the transition between narrow notches and no notches can cause oscillation of the motor and/or DC jitter. Ideally the notches should be continuously reduced in width until they disappear. In practice, however, most inverters impose some minimum "on" and minimum "off" time on the device used as the switch. This is necessary due to the fact that most switching devices must operate with snubbers and/or commutation circuitry which must recover after the switching event. In the past, for example, for apparatus similar to that shown in FIG. 1 herein, the minimum off period was chosen to be approximately 40 microseconds. This allows the snubbers and commutation circuitry in the inverters PA, PB and PC to recover. Unfortunately, if notches and pulses which are shorter than the predetermined minimum time period are deleted, the result will be a sudden increase in motor voltage. When the motor voltage is increased the motor current decreases. Since the DC link in the present embodiment is not a perfect voltage source, the decreasing current will permit the DC link voltage VLINK to rise slightly. However, if the control attempts to compensate for the rise in DC link voltage, the response will be to request a wider notch. If the system is near the transition region AA, the notch becomes wide enough for the inverter switches PA, PB or PC, for example, to reproduce it, resulting in a sudden decrease in motor voltage and corresponding increase of motor current. This causes the DC link to droop. The response to this is to narrow the notch, starting the cycle all over again. This oscillation can result in excessive motor current, causing the drive to shut down. Drastically slowing the response speed of the control can reduce or eliminate the oscillation, but another problem is caused, namely jitter. If the requested notch is approximately the minimum width that can be reproduced, the notches will sometimes occur and sometimes not in a random manner. This results in a DC jitter of the motor current which is objectional for the same reason as an oscillation is objectionable. The solution to the problem is to introduce hysteresis into the pulse producing system in a manner which will be described hereinafter.

CONSTRUCTION FEATURES OF THE PWM BOARD

Referring once again to FIG. 1, the DCLD functional block comprises a resistive element R1 connected on one side to the minus DC input terminal (DC−) and on the other side to the negative terminal of a sensing amplifier S1. The resistor R1A bridges the output and negative input terminal of the sensing amplifier S1. The positive input terminal of the amplifier S1 is connected to one side of a resistive element R2 and to one side of a resistive element R3. The other side of the resistive element R3 is grounded and the other side of the resistive element R2 is connected to the positive DC input terminal (DC+). Capacitive elements C3 and C4 connect the negative and positive DC input terminals to ground respectively. The output of the sensing amplifier S1 is connected to a buffer amplifier B1 by way of a trim plot TP. The output of the buffer amplifier B1 is the DC link voltage VLINK.

The high voltage interface circuit HVII comprises in this embodiment of the invention and for reasons of simplicity of illustration, three like interface circuits INT1, INT2 and INT3, it being understood that circuit INT2 and circuit INT3 are constructed like and perform in essentially the same way as circuit INT1. Circuit INT1 comprises a resistive element R4 connected to the FWDI input terminal on one side and to the input terminal of a bridge BD and one side of a capacitive element C5 on the other side thereof. The other side of the capacitive element C5 is grounded. The other input terminal of the bridge BD is grounded and the output terminals of the bridge are connected by way of zener diode ZD1 to an opto-coupler circuit OC1, the output of which is connected to ground on one side and on the other side to the 15 volt power supply, one side of a capacitive element C6 and the input terminal of an inverting amplifier AI1. The other side of the capacitive element C6 is grounded and the output of the inverting amplifier AI1 provides the output signal FWD which is a digital signal which ranges between a digital 0 and a digital 1, where digital 0 may be represented by 0 volts and digital 1 by +15 volts. The input for the interface circuit INT2 is connected to the REVI input terminal of the PWM block and the output thereof is identified as REV. The input terminal to the interface circuit INT3 is connected to the output of a relay circuit REL1. The input to the relay circuit REL1 is connected at one input terminal thereof to the RUNI input and at the other input terminal to the LTHI input. The relay REL1 is normally connected so that the LTHI terminal is normally open and the RUNI terminal is normally closed on the relay coil. A well-known prior art stop/start switch is interconnected with the LTHI and RUNI input terminals of the relay RELI and with a 120 volt AC source such that when the start button ST is engaged, current runs from the 120 volt AC source through the normally closed stop switch STOP, through the closed start switch ST, through the RUNI input terminal and through the relay coil of the relay REL1. The relay coil causes the switch which is connected to the LTHI input terminal to be engaged to thus allow current to bypass the start switch ST and to continue to flow through the relay coil of the relay RELI, thus latching the start condition. The output of the interface INT3 is the RUN signal.

The speed reference circuit SR comprises an inductor L1, one side of which is connected to the +10 volt power supply and the other side of which is connected to the CW input terminal and to one side of a capacitive element C7. The other side of the capacitive element C7 is connected to the CCW input terminal and to ground. The inductor L1 and the capacitive element C7 act together as a noise filter. The WIP input terminal is connected to one side of a resistive element R5 and to one side of another resistive element R5A. The other side of the resistive element R5 is connected to the positive input terminal of a buffer amplifier B2 and to one side of a capacitive element C8. The other side of the capacitive element C8 and the other side of the resistive element R5A are connected to ground. The output and negative input terminal of the buffer amplifier B2 are tied together. A dual oppositely poled diode arrangement comprising diodes D1 and D2 are connected between the positive input terminal of the buffer amplifier B2 and the output terminal thereof. A zener diode ZD2 is connected at its regulating terminal to the output of the buffer amplifier B2 and at its anode to ground. One side of a potentiometer P1 and one side of a potentiometer P2 are connected to the output of the buffer amplifier B2. The other side of the potentiometer P1 is connected to the 10 volt power supply and the other side of the potentiometer P2 is connected to a third potentiometer P3, the other side of which is connected to ground. The wiper of the potentiometer P1 is connected to the positive input terminal of a buffer amplifier B3 and the wiper of the potentiometer P3 is connected to the positive input terminal of a buffer amplifier B4. The outputs of the buffer amplifiers B3 and B4 are connected to opposite ends of series connected R5B and R5C. The center of series connected R5B and R5C is connected to the positive input of a buffer amplifer P5. The output of the buffer amplifier B5 is the speed signal SS which may range between 0 and 10 volts DC, depending upon the setting of the potentiometer SC and the adjustments of the potentiometers P1, P2, and P3. As was described previously, the minimum speed setting for the motor M is controlled by the potentiometer P1 and the maximum speed setting is controlled by the potentiometer P3.

The control logic block CL comprises, in addition to the previously described enable inhibit selector EIS, an exclusive OR gate EO1, the inputs of which are connected to the FWD and REV outputs of the high voltage input interface HVII. The FWD signal is also connected to the upper terminal of a NAND gate N1, and the output REV is connected to the lower terminal of a NAND gate N2. The previously described ZSPEED input signal is connected to the lower input terminal of the NAND gate N1 and the upper input terminal of the NAND gate N2. The output of the NAND gate N1 is connected to the upper input terminal of a NAND gate N3 and the output of the NAND gate N2 is connected to the lower input terminal of a NAND gate N4. The output of the NAND gate N3 is connected to the other input terminal of the NAND gate N4, and the output of the NAND gate N4 is connected to the other input terminal of the NAND gate N3. Consequently, the four NAND gates N1, N2, N3, and N4 act as a set/reset flip-flop. The output terminal of the NAND gate N3 is connected to one input terminal of an exclusive OR gate EO2 and also represents the FWD/$\overline{REV}$ output signal of the control logic circuit CL. The other input terminal for the exclusive OR gate EO2 is connected to the REV input terminal for the block CL. The output of the exclusive OR EO2 gate is interconnected with one input terminal of a NAND gate N5. The other input terminal of the NAND gate N5 is connected to the output terminal of the exclusive OR gate EO1. The output of the NAND gate N5 is the NODIR output signal described previously. The exclusive OR gate EO1 functions to indicate that the high voltage input interface has provided either a forward FWD or reverse REV signal. As long as one of those signals is present the output of the exclusive OR gate EO1 will be a digital 1. When the flip-flop comprising the four gates N1 through N4 provides a digital 1 at its output, indicating the direction commanded is forward, and if a digital 0 is provided, the output indicated is reverse. This signal is clocked through by the ZSPEED output signal, it being recalled that the ZSPEED output signal occurs when the motor is just started (in either direction) or changes direction after it has been going for awhile. The enable inhibit selector EIS will provide a zero output normally unless the motor is at a stopped position as indicated by the ZSPEED signal or the option of a RUN signal has been chosen, in which case it will switch to a digital 1.

The ramp generator RG comprises a resistive element R6 which is connected to the SPREF output signal of the speed reference selector SRS and the positive input terminal of a buffer amplifier B6. The resistive element R6 will cooperate with the speed reference selector SRS if the inhibit input INH thereof is at a digital 1, which is an indication of no direction for the motor (as supplied by the NODIR signal). In such a case the resistive element R6 will pull the output of the speed reference selector SRS to zero, thus causing a zero to exist on the output of the buffer amplifier B6. Otherwise, the output of the buffer amplifier B6 will be some DC voltage level corresponding to the level provided by the speed reference selector SRS, as indicated on the SPREF output terminal thereof. This voltage is essentially the voltage that is on the X1 input terminal of the SRS device, which is equal to the SS signal coming out of the speed reference device SR. An error amplifier EA1 is connected to the output of the buffer amplifier B6 at the negative input terminal thereof. A resistive device R11 and a parallel capacitive device C9 interconnect the output of the error amplifier EA1 and the negative input terminal thereof. There is provided a string of four serially connected resistors R7, R8, R9 and R10, one end of which is connected to ground, and the other end of which is connected to the 10 volt power supply. There is provided an amplifier A1, the negative input terminal of which is connected to the junction between the resistive elements R7 and R8 and to a parallel connected resistive and capacitive element R12 and C10, respectively, the other sides of which are connected to the output of the amplifier A1 and through a resistive element to the anode of a diode D3. There is provided a comparator CO1, the negative input terminal of which is connected to the junction between the resistive element R8 and the resistive element R9. The output of the comparator CO1 is connected to the junction between a resistive element R14 and a resistive element R15. The other side of the resistive element R14 is connected to the 15 volt power supply, and the other side of the resistive element R15 is connected to one side of a resistive element R16, the other side of which is connected to ground. There is provided another comparator CO2, the positive input terminal of which is connected to the junction between the resistive element R9 and the resistive element R10. The output of the comparator CO2 is connected to one side of a resistive element R13, the other side of which is connected to the 15 volt power supply. The output of the comparator CO2 provides the ZSPEED output signal described previously. This signal will be a digital 1 if the actual speed of the motor is less than 2 Hz, for example, in either direction. The positive input terminal of the error amplifier EA1, the positive input terminal of the amplifier A1, the positive input terminal of the comparator CO1 and the negative input terminal of the comparator CO2 are all interconnected with a signal which is representative of the actual speed of the motor, the production of which will be described hereinafter. The parallel combination of a capacitive element C11 and the resistive element R16 is connected between the negative and positive input terminals of a comparator CO3. When the speed of the motor is greater than or equal to 3.9 Hz, for example, the ouput of the comparator CO1 goes high, thus providing a one second time delay on the output of the comparator CO3, the open collector output of which allows the anode of the diode D3 to interconnect with the amplifier A1. The cathode of the diode D3 is interconnected with the output of the error amplifier EA1. The latter-mentioned action clamps the output of the error amplifier EA1 at approximately 4 Hz for a one second time period for desirable motor function characteristics. Generally, however, the output of the error amplifier EA1 tracks the actual "speed" or motor frequency required of the motor M. The output of the error amplifier EA1 is interconnected concurrently with two reverse serially connected zener diodes ZD2 and ZD3 and a resistive element R17. Th zener diodes prevent the output of the error amplifier EA1 from becoming larger than ±6 volts, for example. The other side of the resistive element R17 is connected to one side of a capacitive element C12 and to the negative input terminal of an integrator INT4, the positive input terminal of which is connected to ground. The integrator network which includes the resistive element R17 and the capacitive element C12 provides at the output thereof a signal related to the commanded speed. The integrated function prevents the motor from accelerating or decelerating too rapidly. This signal is the signal which is fed back to the previously described devices EA1, A1, CO1 and CO2. The output of the integrator INT4 is a positive signal which generally goes between 0 and +10 volts DC, depending upon the speed commanded on the SS output terminal of the speed reference circuit SR. This output is fed through a buffer amplifier B7, the output of which is designated the FREQ output signal. This is a voltage signal which is related to the rotational "speed" or frequency required of the motor M. An amplifier A2 is connected at the positive input terminal thereof to the output of the integrator INT4. The output of the amplifier A2 is provided to the cathode of a diode D4, the anode of which is connected to a junction between a resistive element R18 and a resistive element R19. The other side of the resistive element R19 is connected to the negative input terminal of the integrator INT4. The other side of the resistive element R18 is connected to the INH/ENABLE signal from the control logic circuit CL. The amplifier A2 and its associated circuitry prevents the output of the integrator INT4 from going below zero volts. The resistive element R19 is much smaller than the resistive element R17. If the INH/ENABLE signal goes high, as will occur in a fault condition or stop condition, the integrator will rapidly ramp down, faster than it would normally be allowed to do so.

The FREQ output of the ramp generator RG is provided to two circuits simultaneously. The first circuit or device is the frequency-to-voltage circuit FTV. A potentiometer P4A is connected at one side thereof to receive the FREQ output signal (i.e. to the output of buffer B7) and at the other side thereof to one side of a resistive element R21 and one side of a resistive element R20. The other side of the resistive element R21 is connected to the wiper of the potentiometer P4A. The other side of the resistive element R20 is connected to ground. The wiper of the potentiometer P4A is connected to the positive input terminal of an amplifier A3 which also has a feedback resistor R24 connected between its output and the negative input terminal thereof. The output of amplifier A3 represents the signal VCOM. It is a DC voltage level which is indicative of the voltage commanded of the motor. The negative input terminal of the amplifier A3 is connected to one side of a resistive element R22, the other side of which is connected to the wiper of a potentiometer P5 and to one side of a capacitive element C13. The other side of the capacitive element C13 and one side of the potentiometer P5 are both connected to ground. The other side of the potentiometer P5 is connected to a resistive element R23, the other side of which is connected to the −15 volt power supply. Adjustment of the potentiometer P5 provides a boost signal for the VCOM output. This boost signal will provide a relatively small fixed voltage to overcome the $I^2R$ or real power losses of the motor M at all frequencies. The potentiometer P4A adjusts the volts-per-hertz slope of the output voltage VCOM.

The second circuit or device to which the FREQ output of the ramp generator RG is provided is the voltage-controlled oscillator VCO. There is provided a potentiometer P6, one side of which is connected to receive the FREQ output signal from the ramp generator RG. The other side of the potentiometer P6 is tied together with its wiper and to the negative input terminal of an integrator INT5. The integrator INT5 has connected from the output to negative input terminal thereof a capacitive element C15. Also connected to the negative input terminal of the integrator INT5 is one side of a resistive element R26, the othe side of which is connected to a capacitive element C14. The other side of the capacitive element C14 is connected to the wiper of a potentiometer P7. One side of the potentiometer P7 is grounded and the other side of the potentiometer is connected to the VLINK signal. The positive input terminal of the integrator INT5 is grounded. Also connected to the negative input terminal of the integrator INT5 is the anode of a diode D5, the cathode of which is connected to the anode of a diode D6 and to one side of a resistive element R27. The other side of the resistive element R27 is grounded. Connected to the output of the integrator INT5 is the cathode of a diode D7, the anode of which is connected to ground. The output of the integrator INT5 is connected concurrently to the TH and TR input terminals of a threshold comparator. The output of the threshold comparator is the signal 6FOUT. Also connected to the output of the threshold comparator is one side of an inverter, the output of which is connected to the junction between a resistive element R28 and a resistive element R29. The other side of the resistive element R28 is connected to the +15 volt power supply and the other side of the resistive element R29 is connected to one side of a resistive element R30 and to the cathode of the previously mentioned diode D6. The other side of the resistive element R30 is connected to the −15 volt power supply. The integrator INT5 and its attendant circuitry cooperate with the threshold comparator and its attendant circuitry and the VLINK and FREQ input signals to provide the 6FOUT output signal which is a sawtooth waveform that changes between 10 volts and 5 volts. The frequency of the sawtooth waveform is six times the output frequency that is expected of the motor. The ramp is between 10 volts and 5 volts. When the signal reaches 5 volts it is reset very quickly and the time between resets is proportional to six times the output frequency.

There is also provided a pulse-width-modulation generator PWMG which comprises a pulse generator PG and a hysteresis circuit HS. The signal VCOM is provided to one end of a resistive element R31, the other end of which is connected to the positive input terminal of a comparator CO5 and to one side of a resistive element R32, the other side of which is connected to the output of the comparator CO5. The negative input terminal of the comparator CO5 is connected to the junction between a resistive element R33 and a resistive element R34. The other side of the resistive element R34 is connected to ground. A capacitive element C16 is connected across the resistive element R34. The other side of the resistive element R33 is connected to resistive element R33A, the outer end of which is connected to the VLINK input signal, one side of a resistive element R41, one side of a capacitive element C17, the negative input terminal of an analog inverter AINT and the positive input terminal of a comparator CO7. The other side of the capacitive element C17 is connected to ground as is the positive input terminal of the analog integrator AINT. The other side of the resistive element R41 is connected to the output of the analog integrator AINT and to one side of a resistive element R35. The other side of the resistive element R35 is connected to one side of a capacitive element C19, to the cathode of a diode D9 and to the negative input terminal of an integrator INT6. The positive input terminal of the integrator INT6 is connected to ground. The output of the integrator INT6 is connected to the positive input terminal of a comparator CO8, to the other side of the capacitive element C19, to the cathode of a diode D10, to the negative input terminal of the comparator CO7 and to the negative input terminal of a comparator CO6. The anodes of the diodes D9 and D10 are connected to one side of a resistive element R38. The output of the comparator CO7 is connected to one side of a resistive element R39, to the anode of a diode D10 and to one input terminal of a set/reset flip-flop which comprises two NOR gates connected in classical flip-flop fashion. The output of the comparator CO8 is connected to one side of a resistive element R40 and to the other input terminal of the flip-flop. The other terminal of the resistive elements R39 and R40 are connected to the 15 volt power supply. The output VRAMP of the NOR gate flip-flop is connected to the other side of the resistive element R38. The first side of the resistive element R31, that is the side upon which the signal VCOM is impressed, is connected to one side of a resistive element R25, the other side of which is connected concurrently to the cathode of a diode D8 and to the positive input terminal of the comparator CO6. The anode of the diode D8 is connected to the output terminal of the comparator CO5 and to one side of a resistive element R36. The other side of the resistive element R36 is connected to the +15 volt power supply as is one side of a resistive element R37. The other side of the resistive element R37 is connected to the output of the comparator CO6. The output of the comparator CO6 provides the pulse-width-modulated signal PWMGS. The 6FOUT output signal is connected to one side of an inverting amplifier, the other side of which is connected to the cathode of the diode D10. The output of the analog inverter AINT is connected to a feedback resistor R41, the other side of which is connected to the negative input terminal of the analog inverter AINT and is also connected to one side of a resistive element R35. The other side of the resistive element R35 is connected to the negative input terminal of the integrator INT6, to the cathode of a diode D9 and to one side of the capacitive element C19. The other side of the capacitive element C19 is connected to the output of the integrator INT6. The positive input terminal of the comparator CO6 is identified as having impressed thereon the signal VCOM'.

The 6FOUT signal is also provided to the clock input terminal CLK of the Johnson counter JC. The Johnson counter JC has a Q5, a Q3 and a Q1 output signal. The Q3 output signal is fed back to the DATA input terminal of the Johnson counter JC. All of the aforementioned signals Q5, Q3 and Q1 are provided by way of inverting amplifiers to the input terminals A2, A1 and A0, respectively, of a waveform mixer WM. The A3 input terminal of the waveform mixer WM is connected to receive the PWMGS output signal from the pulse wave modulator generator PWMG. The A4 input terminal of the waveform mixer WM is connected to the FWD/$\overline{\text{REV}}$ input signal and the CE input terminal of the waveform mixer WM is connected to the INH-/e,ovs/ENABLE/ input signal. The outputs of the waveform mixer WM are connected to six inputs of a driver DR. Portion DRA1 of driver DR comprises an inverter, the output of which is connected to the PSOK output signal and to the UA output signal. The output of the devices DRA3 and DRA5 are connected to the UV and UC output signals and the output of the apparatus DRA2, DRA4 and DRA6 are connected to the LA, LB and LC output signals. All of the signals UA, UB and UC and LA, LB and LC are connected (by way of line 12) to the appropriate terminals UA, UB, UC, LA, LB and LC respectively of the inverter devices PA, PB and PC.

Figure 6:
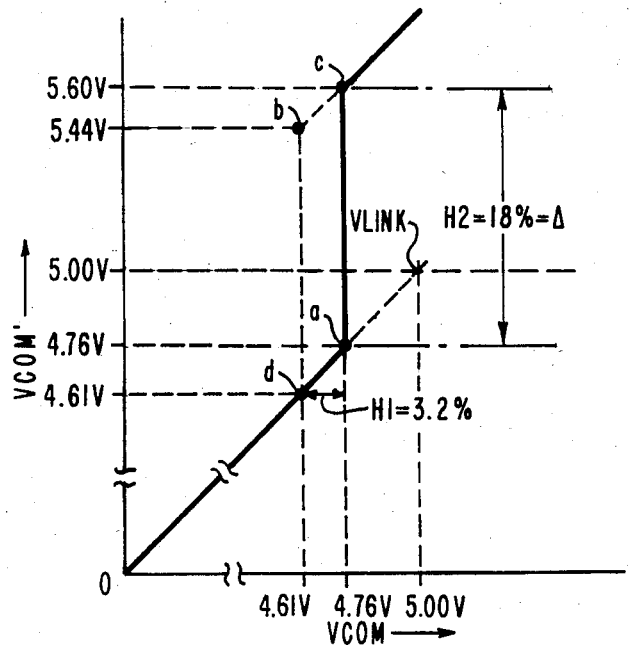
FIG. 6 shows a plot of VCOM versus VCOM' with the hysteresis effect depicted therein.
Figure 4:
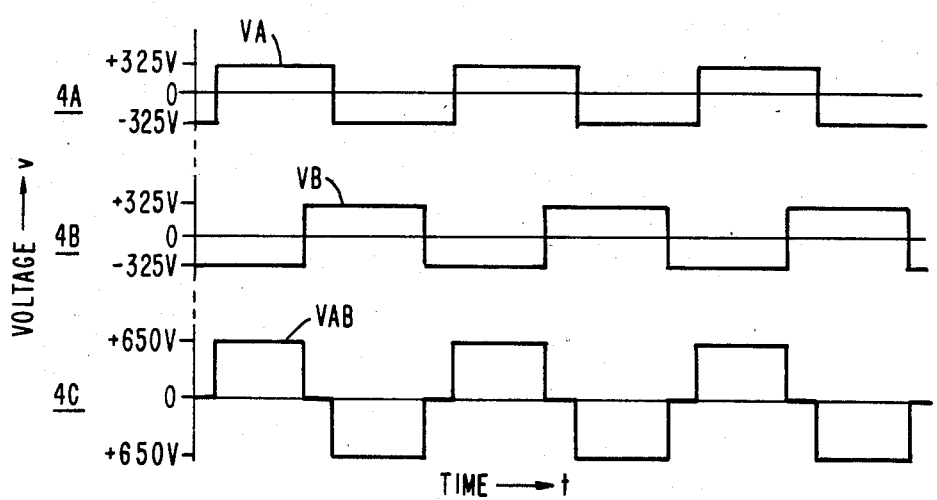
FIG. 4 is similar to FIGS. 2 and 3 but reduced somewhat for simplicity of illustration and is for $f_O$ equal 66.6 Hz.
Figure 5:
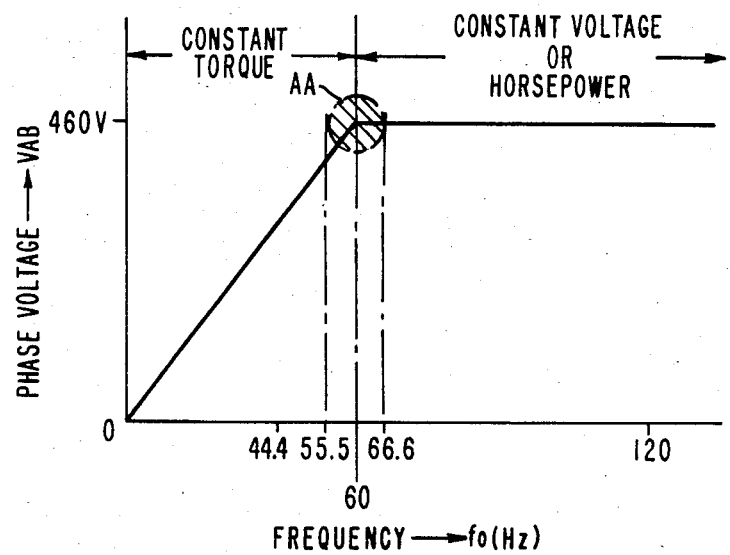
FIG. 5 shows a plot of motor speed or frequency versus phase voltage.

Referring once again to FIG. 1F and to FIG. 6, a non-limiting example of the operation of one aspect of the preferred embodiment of the invention is set forth. The pulse wave modulation generator PWMG has in the upper lefthand portion thereof a dual hysteresis circuit HS which operates in the transition range between pulse wave modulation and pure square wave generation for the purpose of preventing oscillation of the motor as the chopping pulses are discontinued for reasons discussed previously. In a preferred embodiment of the invention the following values are utilized.

TABLE I

R31 = 1 kilohm
R32 = 47 kilohms
R33 = 10 kilohms
R33A = 1 kilohm
R34 = 150 kilohms
R25 = 1 kilohm
VLINK = 5 volts (nominal)
Minimum pulse width = 40 microseconds It has been determined that the switches, snubbers and commutating devices of the inverters PA, PB and PC can operate with pulses down to a pulse width of approximately 40 microseconds. In order to insure that this 40 microsecond value is not attained the system which must stop producing pulses of 40 microseconds or less duration in order to be safe pulse generation must cease at some pulse width value greater than 40 microseconds. The resistor values R33, R33A, R34 and the resistor values R31 and R32 operate together to form a constant K which determines the value at which the comparator CO5 switches state and thus the value at which pulse production is stopped. By way of example utilizing the values of Table 1 the output of the comparator CO5 will move from its low state to its high state when VCOM exceeds 95.3% of VLINK. As will be determined hereinafter VCOM equals 4.76 volts at this time the difference between 5 volts for nominal VLINK and 4.76 volts for VCOM is 0.24 volts. This respresents cessation of pulse production at the 48 microsecond pulse width which is larger than the 40 microsecond pulse width described previously. Resistive elements R33, R33A and R34 act as a voltage divider in conjunction with the VLINK input signal (5 volts DC nominally) to put an approximate value of 4.66 V on the negative input terminal of comparator CO5. The voltage divider is equal to R34÷(R34A+R33+R34), which is equal to 150 kilohms÷161 kilohms. In actuality the resistive values chosen places the decimal fraction at 0.932 of VLINK. Since VLINK is nominally 5 volts, the voltage at the negative input terminal of comparator CO5 is 4.66 volts, (0.932)×(5 V). Consequently, when the positive input terminal of the comparator CO5 has impressed thereon a voltage of 4.66 volts or greater, the output of the comparator CO5 will go high. In order to get 4.66 volts or greater on the positive input terminal of the comparator CO5 when the comparator CO5 output is in the low state, presume that the output of the comparator CO5 is at or near zero volts. This means that the voltage on the positive input terminal of the comparator CO5 is equal to the value VCOM times the voltage divider R32÷(R31+R32). K therefore equals $$\frac{R34}{R34 + R34A + R33} \quad \frac{R31 + R32}{R32} \text{ which} = .951$$

In order for the voltage at the positive input terminal of the comparator CO5 to be equal to the switchover voltage of 4.66 volts, VCOM must equal 4.76 volts, that is 47 divided by 48 times VCOM must equal 4.66 volts. Therefore, VCOM must equal 4.76 volts. This value, 4.76 volts, is shown on the VCOM axis of FIG. 6 at point "a". Since prior to this no current flowed through resistive element R25, VCOM' must therefore also be equal to 4.76 volts. This is also shown at point "a" on FIG. 6. However, at switchover the output of the comparator CO5 goes high, which in the present embodiment of the invention represents an open collector or floating collector state. Consequently, VCOM' changes from VCOM to some value VCOM+Δ. The Δ represents H2 in FIG. 6. In order to calculate what the new value of VCOM' is, it is necessary to realize that the diode D8 becomes forward biased. Consequently, current flows from the 15 volt power supply, through the resistive element R36 and then splits, a portion of it going through the resistive elements R32 in series with R31 and a portion of it going through the diode DB and the resistive element R25. Both currents join again at the output of the amplifier A3 in the FTV circuit of FIG 1E. This point of jointure defines the voltage value VCOM. VCOM at this point in time is 4.76 volts, as was just determined. Calculations will show that at this point of time the value VCOM' equals 5.6 volts. This is equal to 4.76 volts for VCOM plus the current going through the resistive element R25, which is equal to 0.84 milliamps times the resistive value of resistive element R25 which is equal to 1 kilohm. Consequently, it can be seen that at switchover for the comparator CO5, the voltage VCOM' changes from 4.76 volts to 5.6 volts in a step. Since the maximum voltage that can be provided on the negative input terminal of the comparator CO6 for producing pulses is 5 volts when VLINK is in its normal state, it can be easily seen that all pulse production will now cease as 5.6 volts is 0.6 volts greater than 5 volts. This point is shown at "c" in FIG. 6. The difference between point "a" and point "c" (0.84 volts) represents an 18% change and also represents the previously described value Δ. Concurrently with the preceding, it is to be noted that the voltage on the positive input terminal of the comparator CO5 also changes in a step function due to the change of state of the output of the comparator CO5 from zero to the open collector state. In order for the voltage on the positive input terminal of the comparator CO5 to decrease to 4.66 volts again to cause switchover of the comparator CO5 from the high or open collector output state to the low or zero voltage output state, the value VCOM must drop to 4.61 volts. The difference between 4.61 volts and 4.76 volts is noted as H1 in FIG. 6 and is approximately 3.2%, i.e. (4.76–4.61)÷4.76≈3.2%. If VCOM drops to 4.61 volts, VCOM' will change from approximately 5.44 volts to 4.61 volts because at switchover VCOM:=VCOM=4.67 V. Note that 4.61 volts is approximately 92.2% of 5 volts, 100%−92.2%=7.8%. Again, working with the basis of a 1 millisecond period for VRAMP, it can be seen that when pulse production starts again, the minimum pulse width produced will be 78 microseconds. In review then, it can be seen that if 40 microsecond pulses are the minimum that the inverter poles can handle, the circuit HS can be set up to cease pulse production when the minimum pulse is 48 microseconds and pulse production will not begin again until the minimum pulse is 78 microseconds in width. This guarantees that no pulse as small as 40 microseconds is ever to be provided to the inverters. The step function decrease in pulse production provided by the quick step function cessation of pulses at 48 microseconds will cause a change in VLINK which has been determined essentially to be no larger than 8 to 10%. But note that VLINK must change by 18% in order to affect the pulse production once again. Furthermore, once pulse production is stopped at 48 microseconds, the value of VCOM must drop approximately 3.2% before production is started once again.

It has been determined experimentally that the abrupt cessation in pulse generation will cause the motor voltage to change by a value of approximately 6%, causing a current drop of approximately 6 to 10% causing a change in the VLINK signal of approximately 8 to 10%. Consequently, any value of hysteresis H2 for the comparator input voltage CO6 which is greater than approximately 10% will prevent reentry of the pulse-width-modulation generator into the pulse-width modulation mode of operation. The 18% hysteresis was chosen to provide an adequate safety factor.

Note that the maximum value of the ramp signal is always VLINK. If VLINK changes due to a change in the DC power supply voltage, the maximum output of the ramp signal will vary accordingly but the 1 millisecond pulse width will remain the same in all cases. Note that the pulse generator PG relies on both the VCOM and the VLINK inputs for producing a chopping pulse, the width of which is proportional to the difference between VLINK and VCOM. The chopping pulses are produced only for those values of VCOM less than VLINK. For values of VCOM equal to or greater than VLINK no pulses are produced. The hysteresis switching means HS also utilizes the VCOM and VLINK input signals and has a bias signal Δ provided thereto, which signal changes the signal VCOM within said pulse generator means to VCOM+Δ. The Δ signal is applied when VCOM is increasing and VCOM=(K)×(VLINK), where K is a scaling factor indicative of the predetermined minimum pulse width. Note that pulse production will not start again as the result of a dramatic increase in the value of VLINK by an amount X once the relationship of FIG. 6 has changed from a to c unless VCOM' changes by at least an amount Δ where X is the amount VLINK will increase as the result of motor winding voltage increase due to the sudden cessation of chopping production. Inspection of FIG. 1f and FIG. 6 will show that pulse production will not resume in the latter situation unless the value on the negative terminal of the comparator CO6 exceeds or equals the value on the positive terminal thereof. This means that the value VLINK+X must be ≧VCOM+Δ but VCOM=K VLINK therefore as long as the value Δ is >the value X+the value VLINK×the quantity 1-K pulse production will not be reinitiated in the latter case. Note that in the preceding analysis the value R33A is ignored as it is significantly lower than the values R33 and R34 when added together. Note that the value Δ which is 18% in FIG. 6 is identified as H2. This is the second of two hysteresis values the first of which is identified by the symbol H1 which is also shown in FIG. 6. It is important that the relationship between the first hysteresis value H and the second hysteresis value H to be such that when there is a positive going switchover that is from a to c and when there is a negative going switchover that is from b to d that the curve shown in FIG. 6 cross the VLINK value during switchover. Said in another way this means that as the curve moves from a to c it crosses the VLINK value and as the curve moves from b to d it crosses the VLINK value. In the present situation in order for that to happen the value H1 must be less than the value H2. The only other criteria regarding the value H1 is that it not be so large that significant pulse generation be precluded. In the example shown in FIG. 6 pulse generation will start again with a minimum pulse width of 78 microseconds. If H1 is larger then the minimum pulse width becomes larger.

It is to be understood with respect to the embodiment of this invention that it is not limited to use in a motor drive circuit. That it may be used in any circuit and which it is desirable to eliminate the affects of relatively small pulses by quickly moving from a region of substantial pulse generation to no pulse generation.

What I claim as my invention is:

1. Apparatus for controlling the speed of a motor, comprising:
    a source of direct electrical current (PWB) having a nominal DC source voltage (VS) which may vary within limits;
    inverter means (INV) interconnected with said source and the motor (M) for providing controlled power to the motor in the form of controlled variable frequency square waves (VAB), said square waves being chopped in accordance with controlled width-modulated chopping pulses in a predetermined square wave frequency range (CONSTANT TORQUE) for providing speed control and complementary motor winding voltage control in said frequency range, said inverter means being unreliable for producing width-modulated chopping pulses which are narrower than a predetermined minimum pulse width;
    control means (PWM) interconnected with said source and said inverter means for providing controlled signals to said inverter means indicative of the frequency of said square waves and for providing said chopping pulses to said inverter means in accordance with a speed signal (VCOM) and a DC source voltage feed forward signal (VLINK), said control means, comprising:
    pulse generator means (PG) interconnected to receive VCOM and VLINK as inputs for producing said chopping pulses the width of which is proportional to (VLINK-VCOM) for only those values of VCOM less than VLINK, for values of VCOM equal to or greater than VLINK no pulses being produced;
    hysteresis switching means (HS) interconnected to receive VCOM and VLINK as inputs and interconnected with said pulse generator means to selectively provide as an additional input for said pulse generator means a bias signal (Δ) which signal when applied changes the signal VCOM within said pulse generator means to VCOM+Δ said signal (Δ) being applied when VCOM is increasing and VCOM=K(VLINK), where K is a scaling factor indicative of said predetermined minimum pulse width, the value of Δ being equal to or greater than (1-K)VLINK plus X, where X is the amount VLINK will increase as a result of motor winding voltage increase due to the sudden cessation of chopping pulse production so that VCOM nevertheless remains higher than VLINK as VLINK increases due to the increase in motor winding voltage.

2. The combination as claimed in claim 1 wherein Δ>H1, where H1 is the amount of change in VCOM necessary to change the signal VCOM+Δ to VCOM when VCOM is decreasing.

3. Apparatus for controlling an electrical load, comprising:
    a source of direct electrical current having a nominal DC source voltage which may vary within limits;
    inverter means interconnected with said source and the load for providing controlled power to the load in the form of controlled variable frequency square waves, said square waves being chopped in accordance with controlled width-modulated chopping pulses in a predetermined square wave frequency range for providing control for said load in said frequency range, said inverter means being unreliable for producing width-modulated chopping pulses which are narrower than a predetermined minimum pulse width;
    control means interconnected with said source and said inverter means for providing controlled signals to said inverter means indicative of the frequency of said square waves and for providing said chopping pulses to said inverter means in accordance with a load demand signal and a DC source voltage feed forward signal (VLINK), said control means, comprising:
    pulse generator means (PG) interconnected to receive VCOM and VLINK as inputs for producing said chopping pulses the width of which is proportional to (VLINK-VCOM) for only those values of VCOM less than VLINK, for values of VCOM equal to or greater than VLINK no pulses being produced;

hysteresis switching means (HS) interconnected to receive VCOM and VLINK as inputs and interconnected with said pulse generator means to selectively provide as an additional input for said pulse generator means a bias signal ($\Delta$) which signal when applied changes the signal VCOM within said pulse generator means to VCOM+$\Delta$ said signal ($\Delta$) being applied when VCOM is increasing and VCOM=K(VLINK), where K is a scaling factor indicative of said predetermined minimum pulse width, the value of $\Delta$ being equal to or greater than (1-K)VLINK plus X, where X is the amount VLINK will increase as a result of an electrical change in said load so that VCOM nevertheless remains higher than VLINK even though VLINK increases.

4. The combination as claimed in claim 3 wherein $\Delta \leq H1$, where H1 is the amount of change in VCOM necessary to change the signal VCOM+$\Delta$ to VCOM when VCOM is decreasing.

* * * * *